United States Patent [19]

Nakamura et al.

[11] 4,188,979
[45] Feb. 19, 1980

[54] PROTECTIVE COVER FOR A THERMORESPONSIVE TUBE

[75] Inventors: Syuichi Nakamura; Satoshi Ogawa, both of Osaka; Yasuhiro Moriyama, Ibaraki; Tomihisa Ueno, Ibaraki; Minoru Komura, Ibaraki, all of Japan

[73] Assignees: Nitto Denki Kogyo Kabushiki Kaisha, Ibaraki; Osaka Gasu Kabushiki Kaisha, Osaka, both of Japan

[21] Appl. No.: 941,634

[22] Filed: Sep. 12, 1978

Related U.S. Application Data

[63] Continuation of Ser. No. 715,647, Aug. 18, 1976, abandoned.

[30] Foreign Application Priority Data

Aug. 26, 1975 [JP] Japan .............................. 50-104795
Aug. 26, 1975 [JP] Japan .......................... 50-118875[U]
Oct. 9, 1975 [JP] Japan .......................... 50-138956[U]
Oct. 9, 1975 [JP] Japan .......................... 50-138957[U]
Oct. 9, 1975 [JP] Japan .......................... 50-138958[U]

[51] Int. Cl.$^2$ ............................................. F16L 58/02
[52] U.S. Cl. ........................................ 138/109; 138/99; 138/110; 138/141; 156/86; 156/289; 174/DIG. 8
[58] Field of Search ............. 29/157 R, 423; 138/110, 138/147, 99, 141, 109; 285/55, 381, DIG. 16; 156/86, 289, 294; 174/DIG. 8; 403/273; 428/36

[56] References Cited

U.S. PATENT DOCUMENTS

| | | | |
|---|---|---|---|
| 2,599,359 | 6/1952 | Banks et al. | 156/289 X |
| 2,664,373 | 12/1953 | Reilly | 156/289 X |
| 3,415,287 | 12/1968 | Heslop et al. | 138/141 X |
| 3,563,573 | 2/1971 | Crompton | 285/55 |

*Primary Examiner*—Frederick R. Schmidt
*Attorney, Agent, or Firm*—Wenderoth, Lind & Ponack

[57] ABSTRACT

Thermoshrinkable or thermoexpansive tubes for corrosion prevention or lining of piping are disclosed which have their inner and/or outer walls covered with at least one protective cover to keep them clean from dust, dirt, water or any other foreign matter which might interfere with adhesion to the pipe connection, thus causing corrosion or poor lining.

5 Claims, 25 Drawing Figures

PROTECTIVE COVER FOR A THERMORESPONSIVE TUBE

This is a continuation of application Ser. No 715,647, filed Aug. 18, 1976, now abandoned.

The present invention relates to thermoshrinkable or thermoexpansive tubes which have their inner and/or outer wall kept clean from dust, dirt, water, etc. till directly before they are subjected to heat.

For protection of a piping used for the transportation of gas, petroleum, water, etc. against corrosion at its connections, there have been used thermoshrinkable tubes made of butyl rubber, for example, with or without an adhesive layer at its inner periphery, said adhesive layer being covered with a protective cover spirally wound thereon. An ordinary process for coating the connection of a steel pipe with such a thermoshrinkable tube is to put the tube on a steel pipe, weld the pipe portions together, move the tube on the connection, and cause it to shrink by heat so as to closely adhere thereto.

Where steel pipes are to be installed underground, a frequent process is to bury the piping after welding with a thermoshrinkable tube put on the connection, dug it up the next day and subject the tube to heat contraction because work has to be done in a limited time.

The thermoshrinkable tubes without an adhesive layer (single layer type) are liable to have their exposed inner wall stained with dust, dirt, sand, water, etc. before heat contraction. The ones with an adhesive layer (double layer type), too, has more or less the same shortcoming because their protective cover is only temporarily pasted on the adhesive layer and is liable to peel off at its ends owing to vibration or shock during work. If subjected to heat shrinkage with its inner wall dirty with such foreign matter, the tube will not stick fast to the piping. Such foreign matter is also difficult to wipe off particularly if the tube is long or has a small diameter.

The tube is usually put on the pipe after the protective cover has been removed therefrom. Such an order made it troublesome to put it on the pipe and move it toward the pipe connection because the exposed adhesive layer is very sticky. If this order is reversed, namely, the tube is first put on the pipe and then the protective cover is removed therefrom, the removal itself is difficult.

The same is true for thermoexpansive tubes used for lining the inner wall of a steel piping. There have been in the market no thermoexpansive tubes which have their walls, particularly outer wall, kept clean. Therefore, such tubes required wiping off foreign matter from their outer surface before use.

An object of the present invention is to provide improved thermoshrinkable and thermoexpansive tubes which have their inner and/or outer surfaces covered with a protective cover or covers to keep them clean from any foreign matter, thus assuring close adhesion to piping and high corrosion prevention.

Another object of the present invention is to provide improved thermoshrinkable and thermoexpansive tubes which are provided with a protective cover or covers mounted in such a manner as to be easily removed when necessary.

The present invention consists in thermoshrinkable or thermoexpansive tubes which have their entire inner wall and entire or partial outer wall covered with one or two protective covers.

Other features and objects of the present invention will become apparent from the following description taken in connection with the accompanying drawings, wherein.

Figure 20:
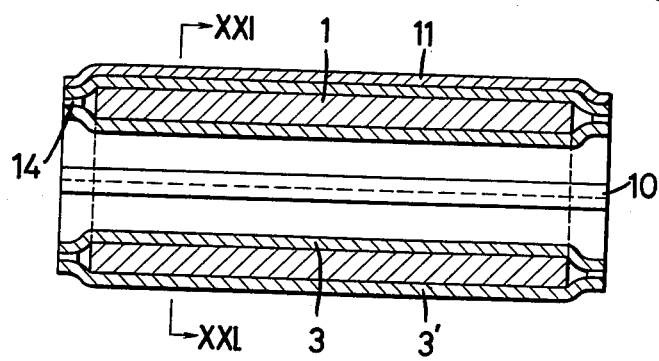
Figure 21:
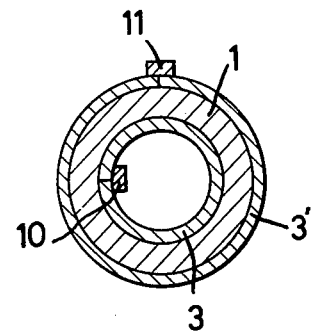
Figure 22:
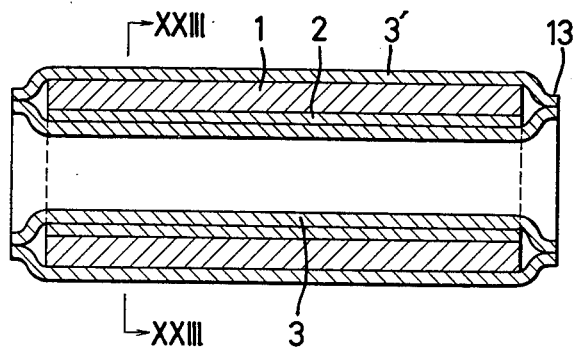
Figure 23:
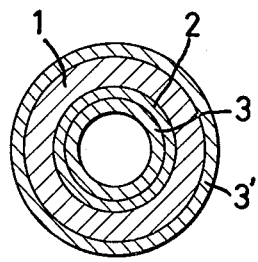
Figure 24:
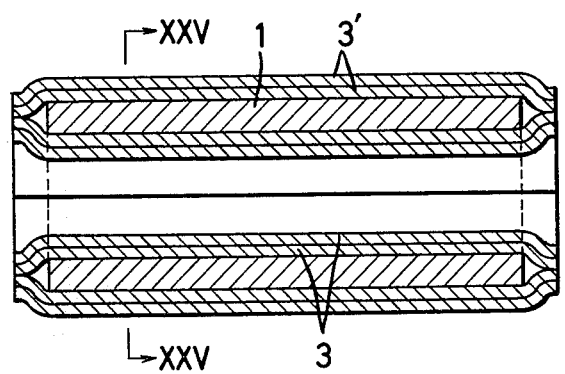
Figure 25:
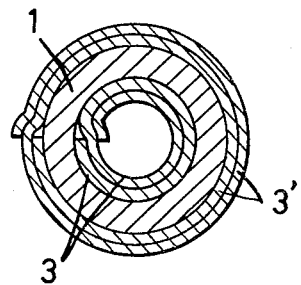

FIGS. 20, 22 and 24 are longitudinal sectional views of the fourth group of the embodiments; and FIGS. 21, 23 and 25 are sectional views taken along lines XXI—XXI, XXIII—XXIII and XXV—XXV in FIGS. 20, 22 and 24, respectively.

The thermoshrinkable or thermoexpansive tubes referred to in this invention are ones which are made of plastic such as polyvinyl chloride, polyethylene, crosslinked polyethylene, polypropylene and fluorocarbon polymer, or rubber such as natural rubber, silicon rubber and ethylene-propylene copolymer rubber and are treated to be thermoshrinkable or thermoexpansive. Such tubes may or may not be provided at their inner or outer wall with a layer of adhesive such as pressure-sensitive adhesive, self-fusing adhesive and heat-activated adhesive.

The protective cover used in this invention is preferably made of material with a sufficient pliability, for example, plastic such as polyethylene, polyester, polyvinyl chloride, unwoven cloth, cloth or paper to be folded or bent at the tube end without being broken or torn. However, the protective cover needs not have such pliability for some embodiments in which it is not folded.

The protective cover used for tubes with an adhesive layer is preferably made of non-adhesive material such as polyethylene or is coated with silicon resin or the like at least on its surface facing the adhesive layer to make it easy to peel off the adhesive layer.

In all figures, like reference numbers and characters denote like parts.

Figure 1:
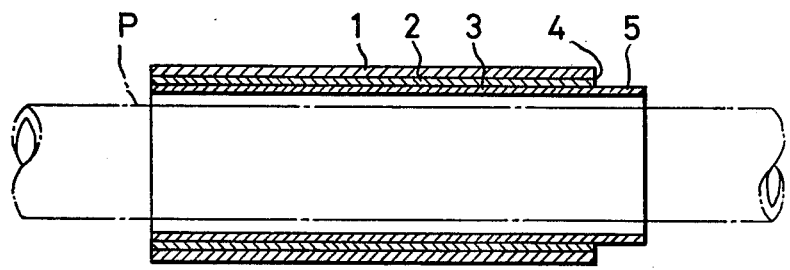
FIG. 1 is a longitudinal sectional view of the first embodiment of the present invention.

Referring to FIG. 1, a thermoshrinkable tube comprises a tube body 1, an adhesive layer 2 on the inner periphery thereof, and a tubular protective cover 3 temporarily attached to the adhesive layer 2 to cover it, said protective cover having one end projecting beyond an open end 4 of the tube to form a projection 5. The protective cover 3 may have both ends projecting beyond the tube ends as shown in FIG. 2.

How to set such a thermoshrinkable tube on the connection of a pipe generally indicated by P is illustrated in FIGS. 2 to 5. The pipe P is provided with a corrosion-proof lining 7 on the entire outer periphery of an elongate steel pipe 6. A pair of steel pipes 6 are connected together at 8 as by welding. The lining 7 is removed adjacent the pipe connection 8.

Figure 2:
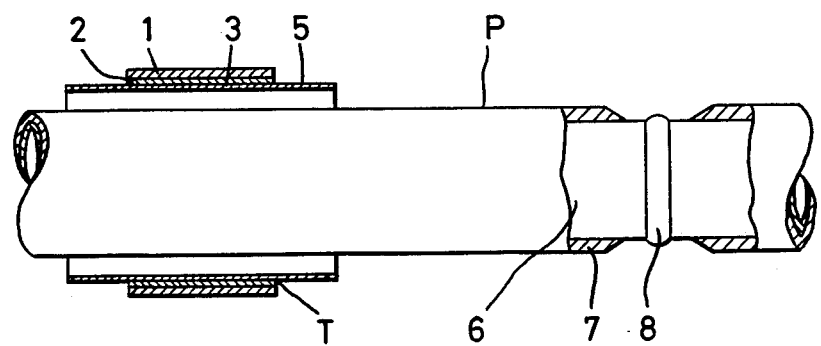
FIGS. 2 to 5 are illustrative of the steps for setting a tube similar to the tube of FIG. 1 on a pipe connection.
Figure 3:
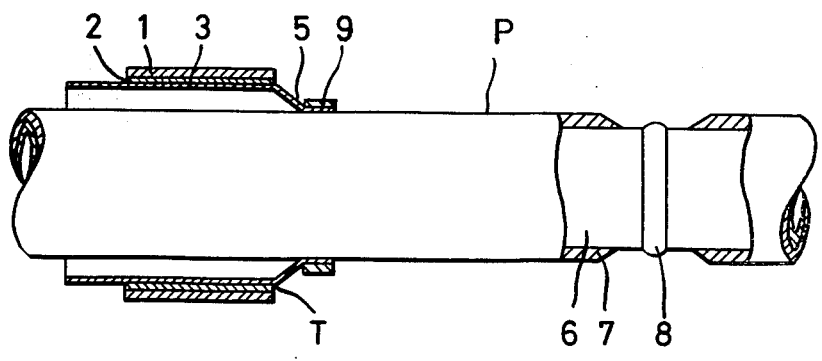
Figure 4:
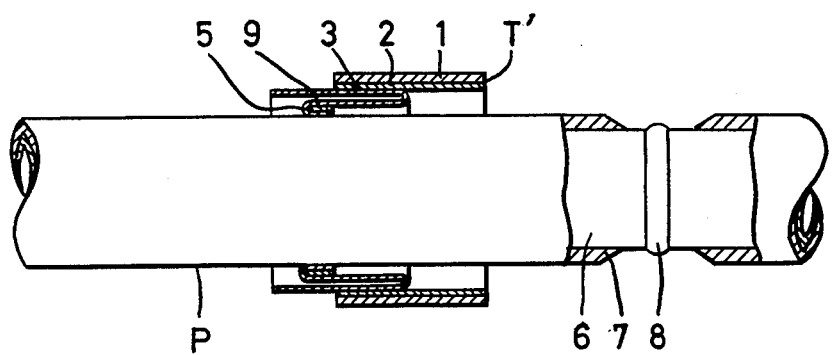
Figure 5:
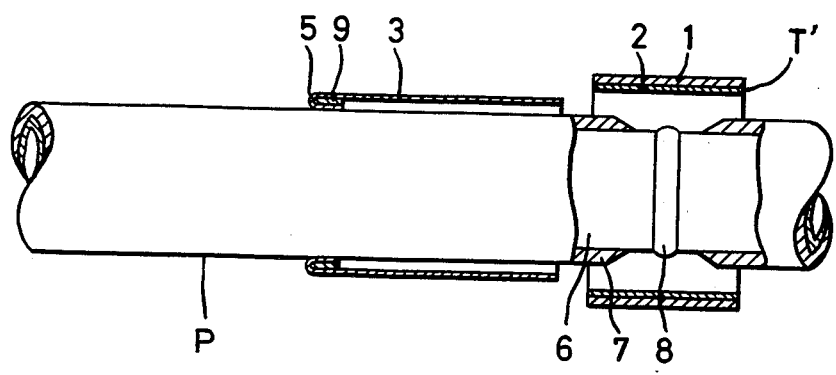

A thermoshrinkable tube T is put on pipe P as in FIG. 2 and the projection 5 disposed closer to the connection 8 is secured to pipe P adjacent to the connection 8 with a fastener means 9 such as a double-coated adhesive tape, a cord or an adhesive as in FIG. 3. The tube is then moved toward the connection 8. Since the cover 3 is fastened to the pipe, it peels off the adhesive layer 2 (FIG. 4). In FIG. 5, a thermoshrinkable tube T' including tube body 1 and adhesive layer 2 has completely left the protective cover 3 and is now located on the connection 8.

When heated with a gas burner, a hot blast blower, a surface heater or the like, the tube body 1 shrinks, pressing the adhesive layer 2 against the portion adjacent to the connection 8 so that the tube tightly adheres to pipe P. This provides secure protection of the piping against corrosion and leakage.

Next, turning to the second group of embodiments illustrated in FIGS. 6–11, the protective cover 3 which has covered the entire inner wall of the tube is folded back at both tube ends and fastened to the outer wall of the tube adjacent its ends with a single- or double-coated adhesive tape, an adhesive or rubber bands.

In this invention, the inner wall of the tube may be covered (1) with a sheet of protective cover of a suitable width, said cover having its ends butted with each other or put one upon the other and fastened together with a single- or double-coated adhesive tape, (2) with a sheet of protective cover of a larger width in a plurality of layers, or (3) with a tubular protective cover having an outer diameter substantially the same as the inner diameter of the tube.

Figure 6:
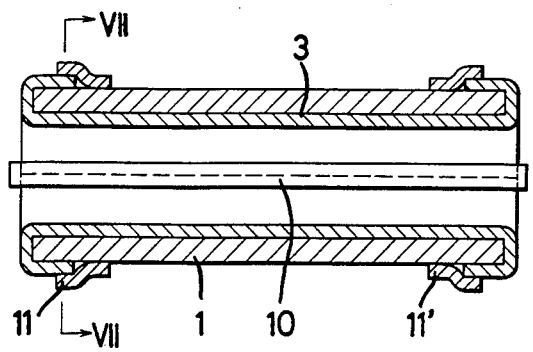
FIGS. 6, 8 and 10 are longitudinal sectional views of the second group of embodiments.
Figure 7:
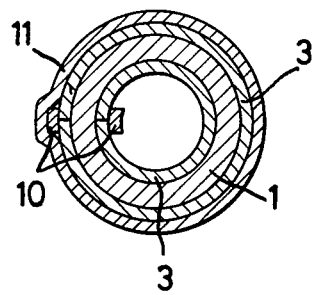
FIGS. 7, 9 and 11 are sectional views taken along lines VII—VII, IX—IX and XI—XI in FIGS. 6, 8 and 10, respectively.

In the embodiment shown in FIG. 6, the entire inner wall of the tube without an adhesive layer is covered with a sheet of protective cover 3 in a single layer, its butted ends being fastened together with an adhesive tape 10. The cover 3 is then folded or bent back at both ends of the tube and secured to the outer wall thereof adjacent to its ends with adhesive tapes 11 and 11'.

Figure 8:
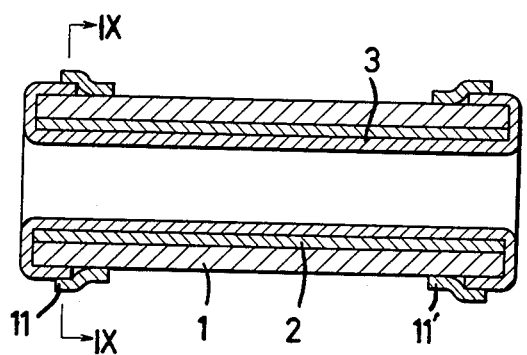
Figure 9:
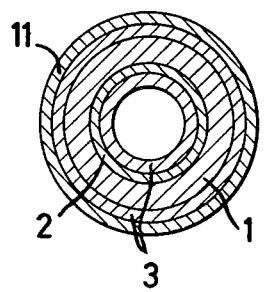

In another embodiment in FIG. 8, a tubular protective cover 3 having substantially the same outer diameter as the inner diameter of the tube is inserted into the tube with an adhesive layer 2 to cover its inner wall. The cover 3 is similarly folded and secured at both ends with adhesive tapes 11 and 11'. The protective cover 3 for this embodiment has an outer wall coated with silicon resin to facilitate peeling off the adhesive layer 2.

In two embodiments shown in FIGS. 6 and 8, the protective cover 3 and the adhesive tapes 10, 11 and 11' are preferably made of waterproof material to keep out not only dust and sand but water.

Figure 10:
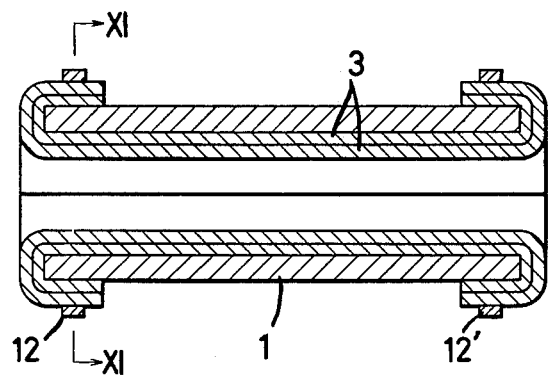
Figure 11:
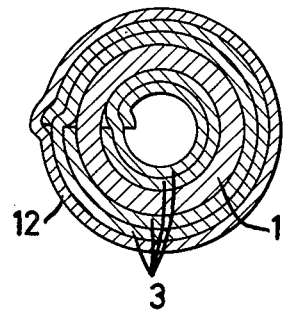
Figure 12:
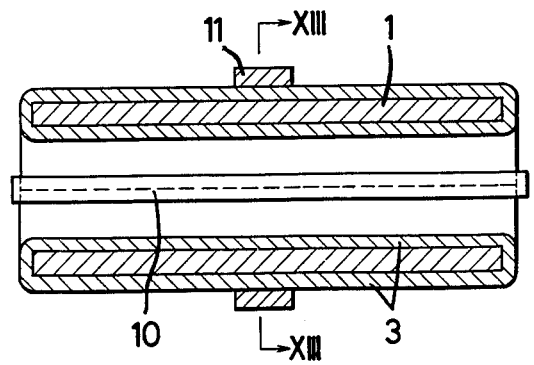
FIGS. 12, 14, 16 and 18 are longitudinal sectional views of the third group of embodiments.
Figure 13:
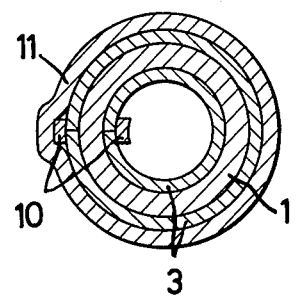
FIGS. 13, 15, 17 and 19 are sectional views taken along lines XIII—XIII, XV—XV, XVII—XVII, and XIX—XIX in FIGS. 12, 14, 16 and 18, respectively.
Figure 14:
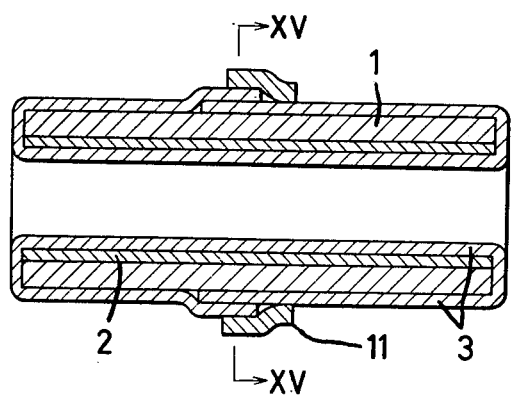
Figure 15:
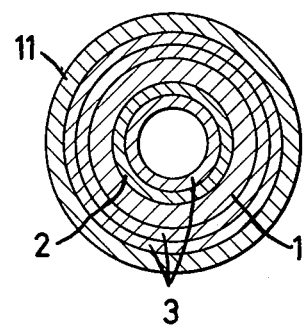
Figure 16:
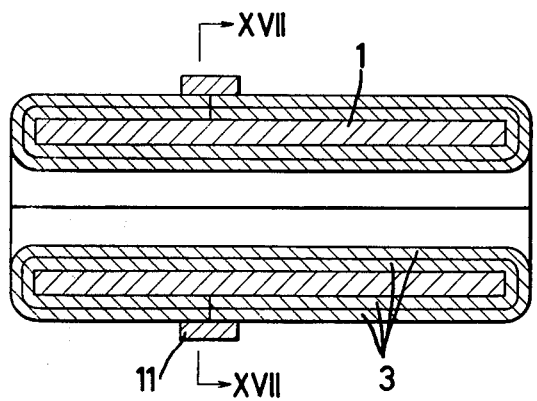
Figure 17:
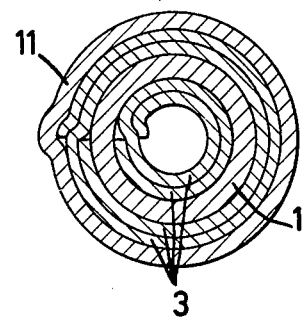

FIG. 10 shows another embodiment suitable particularly for applications where water proofness is not required. The protective cover 3 of cloth or paper is wound in two layers around the inner wall of the tube without an adhesive layer. Its ends are similarly folded at the ends and fastened to the outer wall of tube with rubber bands 12 and 12'.

The third group of embodiments shown in FIGS. 12–19 have not only the inner wall but also the outer wall of the tube completely covered with a single protective cover 3. The embodiments in FIGS. 12, 14 and 16 correspond to those in FIGS. 6, 8 and 10, respectively. The only difference is that after being introduced to the outer wall of the tube from both ends thereof, the ends of protective cover 3 further extend toward the center of the tube to completely cover its outer wall. Its ends are butted with each other in the embodiments of FIGS. 12 and 16 and are put one upon the other in the embodiment of FIG. 14, and are fastened with an adhesive tape 11.

Figure 18:
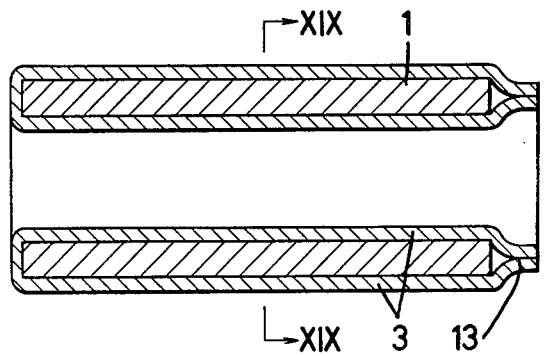
Figure 19:
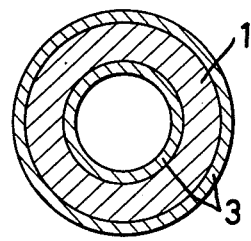

In the embodiment of FIG. 18, after a tubular protective cover 3 with substantially the same outer diameter as the inner diameter of the tube has been put in the tube without an adhesive layer and folded back at one end, its end is brought to the other end to cover the entire outer wall also. The ends of the cover are put one upon the other and sealed at 13 as by heat seal. Conveniently, prior to heat seal, a cord-like member of a heat-resisting material is set between the overlapped ends of the cover with one end thereof protruding to serve as a tab on which to remove the cover later.

The fourth group of the embodiments shown in FIGS. 20 to 25 use two protective covers, instead of one, to cover the inner and outer walls of the tube. The embodiments of FIGS. 20, 22 and 24 correspond to those of FIGS. 12, 14 and 16, respectively, except that not one but two protective covers are used.

In those embodiments, the outer wall of the tube is covered with a protective cover 3' separate from the protective cover 3 for the inner wall. In the embodiment of FIG. 20, the cover 3' in the form of a sheet is wound around the outer wall and its ends are butted and secured together with an adhesive tape 11. In the embodiment of FIG. 22, the cover 3' is made to be tubular with substantially the same inner diameter as the outer diameter of the tube. The cover 3 for the inner wall, too, is tubular with substantially the same outer diameter as the inner diameter of the tube. In the embodiment of FIG. 24, a sheet of cover 3' is wound around the outer wall in two layers.

The corresponding ends of the protective covers 3 and 3' are brought together at both ends of the tube and sealed up with adhesive 14 in the embodiment of FIG. 20 and by heat seal in those of FIGS. 22 and 24. They may be fastened together by any other suitable means, for example, with a paper fastener.

As mentioned before, the protective covers may not be made of non pliable material for the fourth group of the embodiments since they are not bent back at the tube end.

The embodiments in the third and fourth groups, in which both the inner and outer walls of the tube are covered, are particularly suited for thermoexpansive tubes.

In any of the above-mentioned embodiments, the protective cover or covers are removed directly before the tube is subjected to heat shrinkage or expansion.

Although in any of the embodiments the protective cover 3 or 3' is in close contact with the inner or outer wall or with the adhesive layer, there may be some gap therebetween so long as it properly functions to keep them clean of dust, dirt, water, etc.

It will be understood from the foregoing that this invention provides improved thermoshrinkable or thermoexpansive tubes which have their inner and/or outer walls kept clean of dust, sand, water and any other foreign matter and thus are free from the possibility of causing corrosion or leakage due to poor adhesion, and which can be quickly stuck on a pipe connection because the protective cover is easy to remove.

The tubes according to this invention may also be used for other applications, such as for electrical insulation at cable connections and for protection of various kinds of pipes used on ships.

While preferred embodiments have been described, variations thereto will occur to those skilled in the art without departing from the scope of the present invention.

What is claimed is:

1. In a thermoshrinkable tube designed to be wrapped around and to heat-seal pipes to protect the pipes from corrosion, said thermoshrinkable tube having the whole inner wall thereof covered with a protective cover to keep it clean of any foreign matter, the improvement wherein said protective cover located inside said tube has ends projecting beyond the ends of said tube, with said cover ends folded back to the outer wall of the tube at both ends thereof and removably fastened to said outer wall with its ends apart from each other, said protective cover being made of such a material selected from the group consisting of paper and a plastic sheet so that it can be peeled off the tube before the application of heat to the thermoshrinkable tube by unfastening both ends of such protective cover from the outer wall of the tube, fastening one unfastened end of the protective cover to a pipe at a location near the portion of the pipe to be heat-sealed with the thermoshrinkable tube and then moving the thermoshrinkable tube away from the location toward to the portion of the pipe to be sealed so that the protective cover will be turned inside out during and after such movement, thus making it possible to peel off the protective cover from the thermoshrinkable tube just prior to the heat sealing thereof.

2. A thermoshrinkable tube according to claim 1, which has an adhesive layer on the inner periphery thereof.

3. A thermoshrinkable tube according to claim 1, wherein the protective cover is made of a waterproof material.

4. A thermoshrinkable tube according to claim 1, wherein said protective cover is treated to make it easily peelable off the thermoshrinkable tube.

5. A thermoshrinkable tube according to claim 4, wherein said protective cover is treated by being coated with silicon resin to make it easily peelable off the thermoshrinkable tube.

* * * * *